United States Patent [19]

Stares

[11] Patent Number: 4,617,963

[45] Date of Patent: Oct. 21, 1986

[54] CONTROL VALVE WITH ANTICAVITATION TRIM

[75] Inventor: James A. Stares, Norton, Mass.

[73] Assignee: McGraw-Edison Company, Rolling Meadows, Ill.

[21] Appl. No.: 756,567

[22] Filed: Jul. 18, 1985

Related U.S. Application Data

[63] Continuation of Ser. No. 507,064, Jun. 23, 1983, abandoned.

[51] Int. Cl.⁴ .................... F16K 47/08; F15D 1/00
[52] U.S. Cl. .................... 137/625.3; 137/625.37; 138/42; 251/127; 181/226; 181/267
[58] Field of Search .................... 137/625.3, 625.37; 251/127; 181/267, 226; 138/42

[56] References Cited

U.S. PATENT DOCUMENTS

| | | |
|---|---|---|
| 871,775 | 11/1907 | Blanchard et al. .............. 251/127 X |
| 3,780,767 | 12/1973 | Borg . |
| 3,813,079 | 5/1974 | Baumann et al. . |
| 3,954,124 | 5/1976 | Self .............................. 137/625.3 X |
| 3,971,411 | 7/1976 | Baumann . |
| 3,987,809 | 10/1976 | Baumann . |
| 4,367,807 | 1/1983 | Fink et al. ...................... 181/267 X |

FOREIGN PATENT DOCUMENTS 2435561 2/1976 Fed. Rep. of Germany ...... 251/127

OTHER PUBLICATIONS

Fisher Controls, bulletin 80.2.018, Apr. 1976, Cavitrol III, Trim.

*Primary Examiner*—Arnold Rosenthal

[57] ABSTRACT

A control valve includes a valve body with a fluid inlet and a fluid outlet. A valve seat is mounted within the valve body between the inlet and outlet. A valve plug is reciprocally mounted within the valve body to engage the valve seat. A plurality of valve cages are removably mounted on the valve seat and surround the valve plug. The valve cages are mounted to define axial flow galleries. One of the valve cages includes a plurality of apertures and fins that extend radially into a gallery between the first cage and a second cage. The second valve cage is adjacent to and surrounds the first valve cage. The second valve cage includes a plurality of apertures and fins that extend into the gallery area between the second cage and a third cage. The third cage surrounds and is adjacent the second cage. A plurality of apertures are defined in an upper portion of the third cage member. The first, second and third cage members may be positioned such that the apertures in each cage member are out of alignment to define a tortuous path along which fluid must flow between the cage members.

17 Claims, 7 Drawing Figures

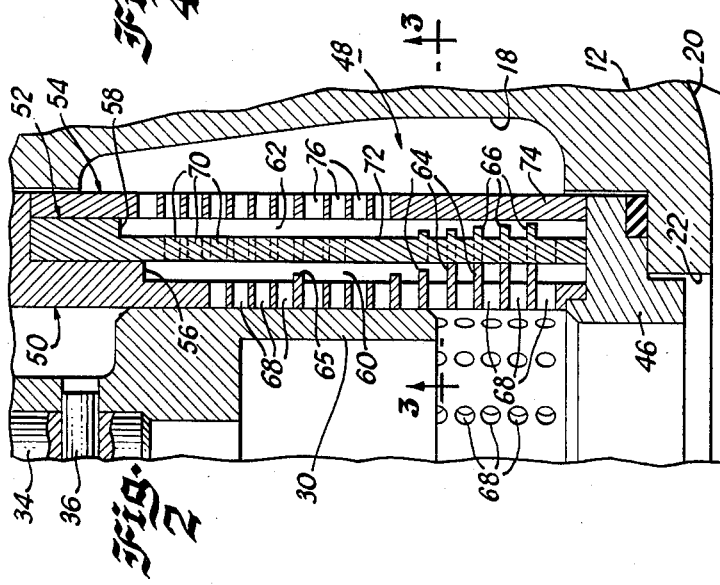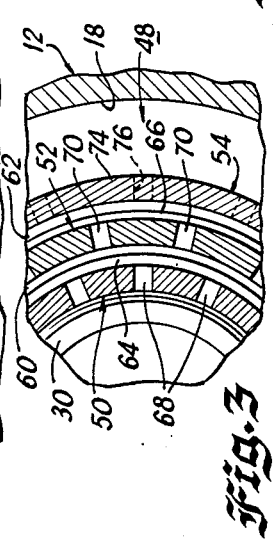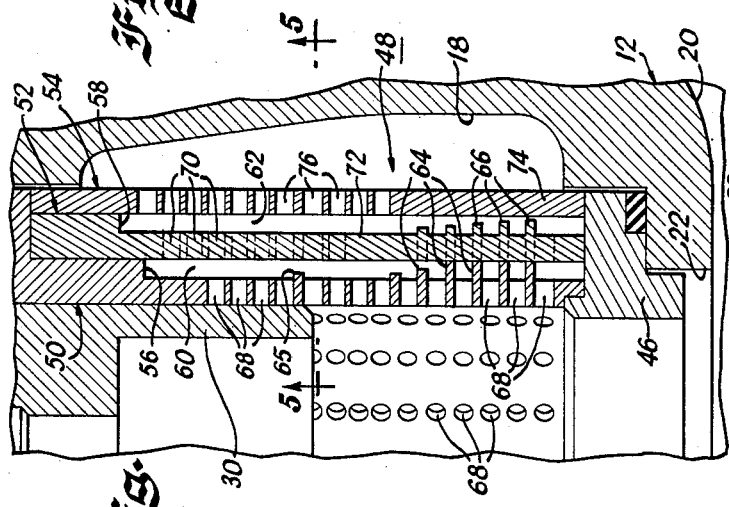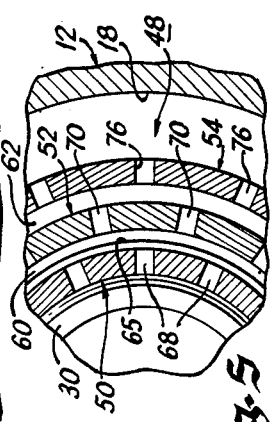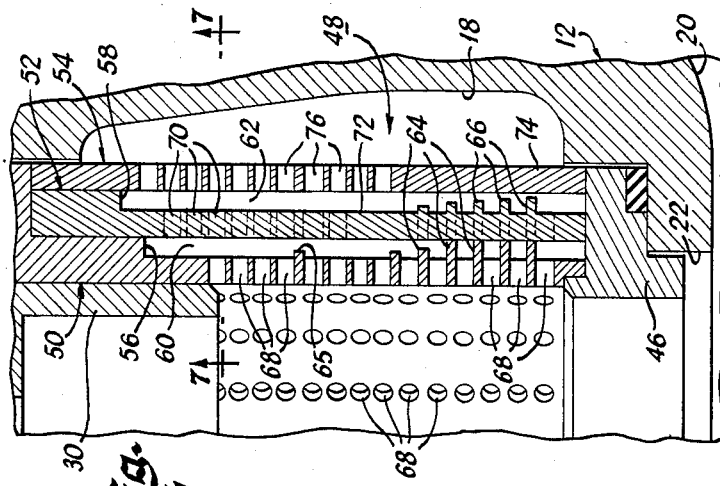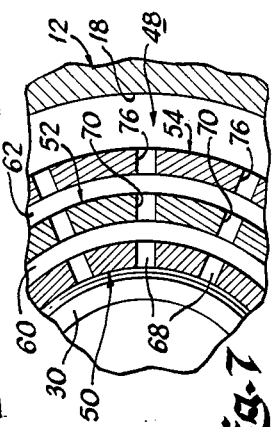

CONTROL VALVE WITH ANTICAVITATION TRIM

This application is a continuation of application Ser. No. 507,064, filed June 23, 1983 now abandoned.

BACKGROUND OF THE INVENTION

A. Field of the Invention

The present invention relates to a new and improved trim design for a control valve that provides energy loss and high resistance to fluid flow by way of collision and separation of the fluid stream thereby preventing cavitation.

B. Description of the Background Art

Cavitation occurring in control valves has a damaging effect resulting in removal of material from internal valve surfaces. Cavitation occurs when pressure at the controlling orifice drops below vapor pressure causing vapor bubbles to form. Beyond the controlling orifice where pressure increases above vapor pressure, the vapor bubbles collapse. Internal portions and components of the valve near the collapsing bubbles suffer cavitation damage. To eliminate cavitation, it is necessary to prevent the pressure at the controlling orifice from dropping below vapor pressure level. This can be accomplished by staging the single valve pressure drop into multiple pressure drops thereby lowering the amount of pressure recovery occuring at any one stage.

There have been three basic techniques employed by valve designers to control or eliminate damage resulting from cavitation. A first technique involves hardening the internal valve surfaces in areas where cavitation may occur. A second technique employs flow-to-close trim designs that direct cavitating fluid jet streams to converge on one another at mid-stream locations thereby causing the vapor bubbles to collapse at locations away from critical internal surfaces and components of the valves. Both of these techniques attempt to minimize and contain the damaging effects of cavitation but do not eliminate cavitation. Consequently, these techniques are normally used for lower pressure drop applications where cavitation is not as severe as in other applications.

A third techique is one of cavitation elimination. Downstream restrictors are used to backup the outlet pressure of a control valve. This technique necessitates the use of staging external to the control valve resulting in expensive and bulky valves.

A trim assembly providing resistance to fluid flow by directing fluid through axially extending fluid energy absorbing passages is disclosed in U.S. Pat. No. 3,971,411. Radial flow passages defined by slots in one or more cylinders is illustrated in U.S. Pat. Nos. 3,813,079 and 3,987,809. A complex and cumbersome assembly for imparting resistance to flow is illustrated in U.S. Pat. No. 3,780,767 that discloses a plurality of plates with cut-out portions defining vortex chambers. Each of the designs disclosed in the above mentioned patents provides a single technique of resisting fluid flow. Each uses either radial or axial flow resistance and are primarily intended for noise abatement. These devices typically do not break the single large valve pressure drop into a number of smaller pressure drop stages to avoid creating vapor pressure bubbles in the fluid controlled by the valve.

SUMMARY OF THE INVENTION

An object of the present invention is to provide a new and improved anti-cavitation control valve.

Another object of the present invention is to provide a new and improved fluid flow valve including a trim design that breaks the valve pressure drop into a number of small pressure drops to prevent cavitation.

A further object of the present invention is to provide a new and improved control valve with a valve trim design defined by a number of close fitting, concentric cylinders that provide both radial and axial tortuous fluid flow paths to prevent cavitation.

Briefly, the present invention is directed to a new and improved fluid flow control valve including a trim design that prevents cavitation within the control valve. The valve includes a valve body with a fluid inlet, a fluid outlet and a valve seat positioned within the valve body between the fluid inlet and outlet. A valve plug is reciprocally mounted within the valve body to engage the valve seat in the valve closed mode.

The trim design includes a plurality of concentric, close fitting cages removably positioned on the valve seat encircling the valve plug. The concentric cages are slightly spaced from each other to define axial flow galleries between adjacent cages.

Properly located apertures and fins in and on the valve cages provide a high resistance flow path with specifically staged areas to prevent fluid pressure from dropping below fluid vapor pressure. The apertures, fins and gallery areas are spaced and sized so that at variable plug lift positions, a continuously changing flow path provides proper pressure drop distribution to prevent cavitation from occurring at intermediate stages as well as the last stage of fluid flow.

The valve trim provides a continuously increasing amount of combined feed area into a common gallery as the valve plug is lifted. This provides a constantly changing flow path configuration and pressure drop distribution as contrasted with most other radially designed trim assemblies.

The combination of radial apertures and fins provides continuous collision and subsequent separation of fluid streams in both radial and axial directions providing for additional high energy loss further avoiding the likelihood of cavitation. The location of the apertures and fins on the cages provides for more staging at the lower lift positions of the valve plug where the pressure drop is highest, and higher capacity and less staging at the higher lift positions where pressure drop is less. Both radial and axial flow paths are provided at the lower lift positions and radial paths only are provided at the higher lift positions.

The staged areas defined by the apertures and fins in the concentric cages provides a continuously decreasing pressure drop from the inlet to the outlet of the concentric cages due to a progressively increasing flow area. This assures that the last stage at the outer cage causes the lowest pressure drop. This is advantageous since it is at this last pressure stage drop being closest to the vapor pressure level which is most likely to cavitate.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 2 is an enlarged, fragmentary, cross-sectional view of cages of the valve illustrated in FIG. 1 with a valve plug in the partial open position;

FIG. 3 is a view taken along line 3—3 of FIG. 2;

FIG. 4 is a view similar to FIG. 2 with the valve plug in a higher lift position;

FIG. 5 is a view taken along line 5—5 of FIG. 4;

FIG. 6 is a view similar to FIGS. 2 and 4 with the valve plug in the full open or lift position; and FIG. 7 is a view taken along line 7—7 of FIG. 6.

DESCRIPTION OF THE PREFERRED EMBODIMENT

Figure 1:
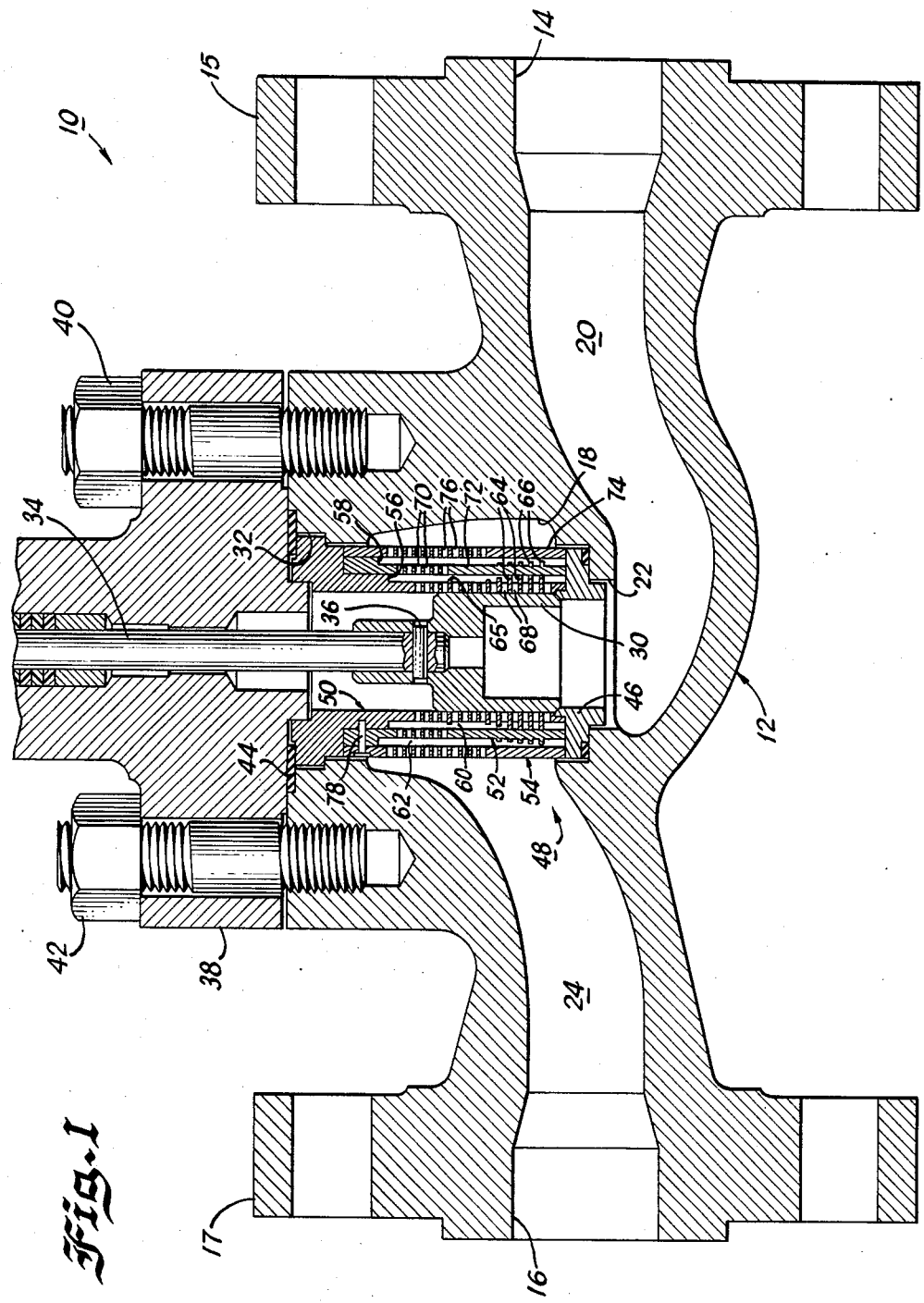
FIG. 1 is a vertical, cross sectional view of a control valve constructed in accordance with the principles of the present invention.

With reference initially to FIG. 1, there is illustrated a control valve generally designated by the reference numeral 10. Valve 10 includes a body 12 with a fluid inlet port 14 and a fluid outlet port 16. Flanges 15 and 17 are mounted on body 12 adjacent inlet 14 and outlet 16, respectively to allow connection of valve 10 to a conduit in a fluid system. A centrally located valve plug chamber 18 is defined within valve body 12 between inlet 14 and outlet 16. Chamber 18 is in fluid communication with inlet 14 by a inlet fluid flow passage 20 defined in body 12 and a port 22. Fluid outlet 16 is in communication with chamber 18 by an outlet fluid flow passage 24.

Valve 10 functions under a pressure drop between 500 p.s.i. and 3,000 p.s.i. in one commercial embodiment, which can cause cavitation that could damage the internal surfaces of valve body 12. Fluid flow through valve 10 is controlled by a reciprocally mounted valve plug 30 located within chamber 18. The upper end of chamber 18 includes an opening or aperture 32 to allow the insertion of the valve plug 30 into chamber 18. Valve plug 30 is reciprocated within the chamber 18 by an external valve controller (not shown) mechanically connected to the valve 30 by a stem 34 that extends through aperture 32 and is secured to valve plug 30 by a pin 36. Pin 36 provides a removable connection between stem 34 and valve plug 30 allowing easy removal of valve plug 30 for replacement or repair.

A removable valve bonnet 38 is secured to valve body 12 by threaded studs or fasteners 40 and 42. A gasket 44 encircles aperture 32 and is maintained in position by bonnet 38 to provide a seal between bonnet 38 and valve body 12. In the valve closed position (FIG. 1), valve plug 30 sealingly engages a valve seat ring 46 removably positioned in aperture 22.

To prevent cavitation in valve 10, a high resistance fluid flow path is provided by a valve cage assembly generally designated by the reference numeral 48. Valve cage assembly 48 includes a plurality of close fitting, concentric cages. In the preferred embodiment illustrated, there are three cylindrical cages 50, 52 and 54 although any number may be used depending on the desired design. Cylindrical cages 50, 52 and 54 include apertures, fins and gallery areas that are spaced and sized such that at variable lift positions of plug 30 a continuously changing flow path provides the desired pressure drop distribution to prevent cavitation.

Cages 50 and 52 include flanges 56 and 58, respectively, that define spaces or gallery areas such as the axial flow gallery area 60 between cages 50 and 52 and the axial flow gallery area 62 defined between cages 52 and 54. Cage 50 further includes a plurality of ribs or fins 64 defined on a lower portion. Cage 52 also includes a plurality of fins or ribs 66 located on a lower portion whereas cage 54 does not include fins.

Radial passages through first cage 50 are defined by a plurality of apertures or openings 68 in the entire length of cage 50 corresponding to the full range of lift positions of valve plug 30. Second cage 52 includes radial openings or apertures 70 in a lower portion and upper portion of the cage 52 with an impervious portion 72 between the upper and lower portions. Third cage 54 includes an impervious lower portion 74 and an upper portion including a plurality of apertures 76.

Cages 50, 52 and 54 are removably positioned within valve body 12 and radially held by a pin 78. Removal of pin 78 allows the middle or second cage 52 to be rotated relative to first cage 50 and third cage 54. Rotation of cage 52 moves apertures 70 out of alignment with apertures 68 in lower portion of cage 50 (FIG. 3). This misalignment requires fluid to flow through a tortuous flow with turns to flow through apertures 70. Fluid flow in the lower lift positions (FIGS. 2 and 3) engages and is directed by fins 64 in the axial gallery area 60. As flow passes through apertures 70 in the lower portion of cage 52, it enters axial gallery area 62 flowing upward past fins 66 then turning through apertures 76 into chamber 18. This configuration provides more stages improving anti-cavitation. This is desirable since it is at the lower lift positions that the pressure drop is the highest with the greatest potential for cavitation.

If valve plug 30 is lifted to approximately the half-open position (FIGS. 4 and 5), a larger number of apertures 68 are exposed and flow through the lower portions of cages 50 and 52 passes through the tortuous path already described. In the middle portion of cages 50 and 52, apertures 70 and 68 are mis-aligned with apertures 76 (FIG. 5) and flow is substantially radial.

In larger valves, the flow area defined by the apertures 70 and 76 may be substantially greater than the flow area in the gallery 60 and there will be little flow through and little pressure drop across the lower portion of cage 52. To break up flow in gallery 60 in these larger valves, a fin 65 is included that directs some of the flow in gallery 60 through apertures 70 in the lower portion of cage 52 thereby more evenly distributing the total pressure drop over the full length of cage 52.

At the full open or top lift position of plug 30 (FIG. 6), apertures 68, 70 and 76 are fully exposed but misaligned allowing a tortuous radial flow with higher capacity and less staging since it is at this level that the pressure drop is less. Optionally, at their higher lift positions, apertures 68, 70 and 76 can be aligned (FIG. 7) and/or enlarged to provide for even higher capacities. At the lower lift positions (FIGS. 2 and 3), there is a higher pressure drop and more severe conditions for potential cavitation. Accordingly, both radial and axial flow paths at the lower lift positions are provided whereas only radial flow paths are required at the upper or higher lift position.

At the lower lift positions, the only axial flow path is in the gallery area 62. The axial flow in gallery 60 is added as the valve plug 30 is lifted to the middle lift positions (FIGS. 4 and 5) above the laft full fin 64. This configuration provides progressively increasing flow area to assure that the last stage at the outer cage 54 takes the lowest pressure drop which is advantageous as it at this last stage pressure drop, being closest to the vapor pressure level, which is most likely to cavitate.

Since gallery areas 60 and 62 are always exposed to flowing fluid, there is always a pressure drop distribution along the outer diameter of valve plug 30. In contrast, prior art radial designs separate flow into individual radial paths at different lift levels and there is no pressure drop staging above the plug lift position. Thus, the full pressure drop is across the leading edge of the valve plug resulting in some cavitation damage occurring at the leading edge of the plug.

What is claimed and sought to be secured by Letters Patent of the United States is:

1. A valve comprising:
   a. a valve body with a fluid inlet and a fluid outlet,
   b. a valve seat ring positioned in said valve body between said fluid inlet and said fluid outlet,
   c. a valve plug reciprocally mounted in said valve body and engaging said valve seat ring in a valve closed mode,
   d. a first cage member positioned in said valve body having two ends, a plurality of apertures, and a plurality of radially extending fins disposed over only one end of said first cage,
   e. a second cage member positioned in said valve body adjacent said first cage member and having two ends, a plurality of apertures adjacent only each end of said second cage member, and a plurality of radially extending fins over only one portion of the length of said second cage member,
   f. a third cage member positioned in said valve body adjacent said second cage member and having two ends, and a plurality of apertures adjacent only one end of said third cage member, and
   g. said cage members being positioned in said valve body to define substantially continuous axial, circumferential and radial flow passages between adjacent cage members which flow passages vary with the position of said plug from its closed mode.

2. The valve set forth in claim 1, wherein said cage members are cylindrical.

3. The valve set forth in claim 1 wherein said plurality of cage members are cylindrical and concentric.

4. The valve set forth in claim 1 wherein said first, second and third cage members are movably positioned to allow rotation relative to each other.

5. The valve set forth in claim 1 wherein said cage members are concentric to and surround said valve plug.

6. The valve set forth in claim 1 wherein:
   a. the lower end of each said cage member engages said valve seat ring,
   b. said apertures in said first cage member are disposed along the entire length of said first cage member, said first cage member including a lower portion and an upper portion, said fins on said first cage member being only on said lower portion of said first cage member,
   c. said second cage member includes a lower portion, a middle portion and an upper portion, said apertures in said second cage member being only in said lower and upper portions of said second cage member, said middle portion being generally impervious to radial fluid flow, and
   d. said third cage member includes an upper portion and a lower portion, said apertures in said third cage member being only in said upper portion of said third cage member, said lower portion of said third cage member being generally impervious to radial fluid flow.

7. A control valve with an anti-cavitation trim design comprising:
   a. a valve body,
   b. a fluid inlet in said valve body,
   c. a fluid outlet in said valve body,
   d. a valve chamber in said valve body in fluid communication with said fluid inlet and said fluid outlet,
   e. a valve seat in said valve chamber,
   f. a valve plug mounted for reciprocal movement in said valve chamber and engageable with said valve seat in the valve closed mode, and
   g. a plurality of concentric cages surrounding said valve plug and spaced from each other to define fluid chambers, each of which chambers extends axially along substantially the entire length of adjacent cages, and including:
      (i) a first cage having a plurality of apertures and a plurality of circumferential fins extending into an adjacent one of said chambers, said apertures being disposed throughout the entire length of said first cage and corresponding to the full range of movement of said valve plug, said fins being disposed over less than the entire length of said first cage,
      (ii) a second cage disposed adjacent to said first cage and having a plurality of apertures in first and second separated areas of said second cage and a plurality of circumferential fins in only one area thereof extending into another of said chambers, and
      (iii) a third cage having a plurality of apertures in only one area thereof.

8. The control valve claimed in claim 7 wherein said first, second and third cages are cylindrical and encircle said valve plug.

9. The control valve as in claim 7 wherein said first area in said second cage has both apertures and said fins, said second area has only apertures and a fluid impervious area separates said first and second areas.

10. A control valve comprising:
   a. a valve body including a fluid inlet and a fluid outlet,
   b. a valve seat position in said valve body between said fluid inlet and said fluid outlet,
   c. a valve plug reciprocally mounted in said valve body for travel in a path from a fully closed to a fully opened position,
   d. a first cylindrical valve cage removeably mounted on said valve seat surrounding said valve plug, said first valve cage having an upper and lower portion including a plurality of apertures throughout the length of said first valve cage and a plurality of radially extending circumferential ribs on only a portion of the length of said first valve cage,
   e. a second cylindrical valve cage which is concentric with said first valve cage and spaced therefrom to define a first axial chamber adjacent to and overlapping the travel path of said valve plug, said ribs on said first valve cage extending into said first chamber, said second cage including a plurality of apertures in less than the entire length of said second cage, and a plurality of radially extending ribs disposed over only a portion of the length of said second cage, and
   f. a third cylindrical valve cage which is concentric with said first and second valve cages, removeably mounted on said valve seat, and spaced from said second valve cage to define a second axial chamber adjacent to and overlapping the travel path of said valve plug, said ribs on said second valve cage extending into said second apertures in only a portion thereof.

11. The control valve set forth in claim 10 wherein said second valve cage includes an upper portion, a middle portion and a lower portion, said middle portion being generally impervious to fluid flow, only said upper and lower portions including said apertures, and only said lower portion including said ribs.

12. The control valve set forth in claim 10 wherein said third valve cage includes a lower portion and an upper portion, said lower portion being generally impervious to fluid flow, said apertures being only in said upper portion.

13. The control valve set forth in claim 10 further comprising an additional fin or an upper portion of said first valve cage.

14. The control valve set forth in claim 10 wherein said apertures in said lower portion of said first valve cage are in a circumferentially offset radial relationship with corresponding apertures in said second valve cage.

15. The control valve set forth in claim 10 wherein a portion of said apertures in said second valve cage are generally in radial alignment with said apertures in said thid valve cage.

16. A valve comprising:
   a. a valve body with a fluid inlet and a fluid outlet,
   b. a valve seat ring positioned in said valve body between said fluid inlet and said fluid outlet,
   c. a valve plug reciprocally mounted in said valve body engaging said valve seat ring in a valve closed mode,
   d. a plurality of concentric tubular sleeves forming a fluid flow path between said fluid inlet and said fluid outlet as said plug is moved from its fully closed to its fully opened position,
   e. means forming an annular chamber between each two adjacent sleeves, each said chamber extending axially substantially the length of said plug travel,
   f. means associated with said tubular sleeves and said chambers in a first range of movement of said plug to cause said fluid to flow radially, axially and circumferentially in order to pass through said sleeves and said chambers from said inlet to said outlet substantially only in said first range of movement of said plug,
   g. means associated with said sleeves and said chambers in a second range of movement of said plug to cause said fluid to flow substantially only radially and circumferentially in order to pass through said sleeves and daid chambers from said inlet to said outlet substantially only in said second range of movement of said plug, and
   h. means associated with said tubular sleeves and said chambers in a third range of movement of said plug to cause said fluid to flow substantially only radially to pass through said sleeves and said chambers from said inlet to said outlet substantially only in said third range of movement of said plug whereby the total flow path varies with movement of said plug through said first, second and third ranges of movement of said plug.

17. A valve as in claim 16 wherein said concentric tubular sleeves comprises:
   a. a first tubular sleeve having a first plurality of spaced orifices therein throughout the length of said plug travel, said first spaced orifices communicating radially into a first one of said chambers,
   b. a second tubular sleeve having an annular central portion that is fluid impervious to cause axial flow of fluid in said first chamber from juxtaposed ones of said first orifices in said first sleeve and a second and third plurality of spaced orifices in said second sleeve on either side of said central portion respectively, said second plurality of orifices and at least a portion of said third plurality of orifices being radially aligned with but circumferentially offset from first predetermined ones of said first orifices in said first sleeve for causing substantially circumferential flow of fluid in said first chamber between said first and second sleeves and the remainder of said third orifices being in serial radial alignment with second predetermined ones of said first orifices in said first sleeve to cause radial flow of fluid between said first and second sleeves, said second and third plurality of orifices being in fluid communication with said second chamber, and
   c. a third tubular sleeve having a lower portion thereof impervious to fluid flow to cause axial flow of fluid in said second chamber from juxtaposed ones of said second plurality of orifices in said second sleeve and an upper portion with a fourth plurality of orifices therein, said fourth plurality of orifices having first, second and third orifice groups, said first group of orifices being radially juxtaposed with said fluid impervious central portion of said second tubular sleeve thereby receiving only axial fluid flow from said second chamber, said second group of orifices being circumferentially offset from first predetermined ones of said third orifices in said second sleeve thereby receiving substantially only circumferential fluid flow through said second chamber to said second group of orifices, and said third group of orifices being radially aligned with second predetermined ones of said third orifices in said second sleeve thereby causing fluid to flow substantially radially through said second chamber to said third group of orifices.

* * * * *